United States Patent [19]
Morkovsky et al.

[11] Patent Number: 5,928,493
[45] Date of Patent: Jul. 27, 1999

[54] PROCESS AND APPARATUS FOR ELECTROCOAGULATIVE TREATMENT OF INDUSTRIAL WASTE WATER

[75] Inventors: Paul E. Morkovsky; Douglas D. Kaspar; Jonathan M. Petru, all of Shiner, Tex.

[73] Assignee: Kaspar Electroplating Corporation, Shiner, Tex.

[21] Appl. No.: 08/976,695

[22] Filed: Nov. 24, 1997

[51] Int. Cl.[6] ............................................... C02F 1/461
[52] U.S. Cl. ..................... 205/757; 204/237; 204/269; 210/521
[58] Field of Search ...................... 205/757; 204/237, 204/269; 210/521

[56] References Cited

U.S. PATENT DOCUMENTS

| | | |
|---|---|---|
| 672,231 | 4/1901 | Lacomme . |
| 820,113 | 5/1906 | Hinkson . |
| 2,864,750 | 12/1958 | Hughes et al. . |
| 3,247,091 | 4/1966 | Stuetzer . |
| 3,314,872 | 4/1967 | Waterman . |
| 3,679,556 | 7/1972 | Doevenspeck . |
| 3,849,281 | 11/1974 | Bennett et al. . |
| 3,925,176 | 12/1975 | Okert . |
| 3,964,991 | 6/1976 | Sullins . |
| 3,975,795 | 8/1976 | Kupcikevicius . |
| 4,073,712 | 2/1978 | Means et al. . |
| 4,085,028 | 4/1978 | McCallum . |
| 4,124,480 | 11/1978 | Stevenson . |
| 4,175,026 | 11/1979 | Houseman . |
| 4,293,400 | 10/1981 | Liggett . |
| 4,339,324 | 7/1982 | Haas . |
| 4,347,110 | 8/1982 | Joyce et al. . |
| 4,378,276 | 3/1983 | Liggett . |
| 4,406,768 | 9/1983 | King . |
| 4,500,403 | 2/1985 | King . |
| 4,747,196 | 5/1988 | Moir ......................................... 210/521 |
| 4,789,450 | 12/1988 | Paterson . |
| 4,790,923 | 12/1988 | Stillman . |
| 4,872,959 | 10/1989 | Herbst et al. . |
| 4,902,391 | 2/1990 | Ibbott . |
| 5,043,050 | 8/1991 | Herbst . |
| 5,234,555 | 8/1993 | Ibbott . |
| 5,271,814 | 12/1993 | Metzler . |
| 5,302,273 | 4/1994 | Kemmerer . |
| 5,423,962 | 6/1995 | Herbst . |
| 5,458,758 | 10/1995 | Suchaca . |
| 5,549,812 | 8/1996 | Witt . |
| 5,611,907 | 3/1997 | Herbst et al. . |
| 5,746,904 | 5/1998 | Lee .......................................... 205/757 |

FOREIGN PATENT DOCUMENTS

| | | |
|---|---|---|
| PCT/US96/09644 | 6/1996 | WIPO . |

*Primary Examiner*—Arun S. Phasge
*Attorney, Agent, or Firm*—Miller Sisson Chapman & Nash P.C.

[57] ABSTRACT

A process for the treatment of industrial waste water using electrocoagulation to effect separation of contaminants, which may include heavy metals, dyes, oils, fats, solvents, and salts. The process comprises passing waste water containing contaminants susceptible to electrocoagulation between pairs of electrodes within a reactor cell, energizing the electrodes with direct current, thereby breaking down and chemically altering contaminants in the electrolyzed water to form a sedimentable flocculate therein; and separating the flocculate from cleaned water. The invention also anticipates an apparatus for treating waste water which comprises: an electrocoagulation reactor cell having spaced-apart electrodes energized by direct current, a pump for passing industrial waste water through the reactor and between the electrodes, a de-foam tank, a mechanical clarifier, and a recessed-plate filter press.

30 Claims, 9 Drawing Sheets

PROCESS AND APPARATUS FOR ELECTROCOAGULATIVE TREATMENT OF INDUSTRIAL WASTE WATER

BACKGROUND OF THE INVENTION

1. Field of the Invention

The present invention relates to a process for the treatment of industrial waste water by electrolysis and, more particularly, for cleaning industrial waste water recovered, for example, from industrial boilers, or otherwise containing contaminants, utilizing an electrocoagulative process to chemically bond with a particle to change the particle from in solution to in suspension which can be flocculated and separated from the water. The invention also relates to an apparatus for carrying out the process and especially to an electrolytic cell and clarifier used for that purpose.

2. Description of the Related Art

The present invention is directed to improving processes and apparatuses for removing impurities from fluids in a manner which is safe, economical, and user friendly. Attempts by others to provide improvements in the art of water purification are represented by the inventions described below.

U.S. Pat. No. 3,849,281 issued to Bennett, et al. discloses a vertically disposed electrolytic cell used to produce hypochlorite solutions. This unit, while impressing a sinuous path upon the fluid to be treated, requires the use of U-shaped plates as a cathode; current is applied only at the outer extremities of the device. This device is divided up into a series of partitioned cell units; it is not constructed so that the individual cell units may be easily cleaned or repaired.

U.S. Pat. No. 4,124,480 issued to Stevenson is directed to a bipolar cell consisting of stacked electrode plates which impresses a sinuous, or partially-sinuous, path upon the electrolytic fluid traveling through it. A partially sinuous path is described when fluid flow stagnation at the ends of the plates is relieved by pathways existing at the ends of certain plates along the path. This cell is used for the electrolytic generation of chlorine from sea water or other brines. The outer plates are both connected to a positive source so as to act as anodes, and the central plate is connected to a negative source to act as a cathode. This device is used for a different purpose than that of the present invention, and is not constructed so as to be particularly easy to disassemble for repair and replacement of interior parts, since each electrode is held in place with a separate O-ring type seal, which must be carefully removed from the cell assembly during inspection to avoid damage, and if damaged, requires replacement.

U.S. Pat. No. 4,339,324 issued to Haas speaks to a gas generator composed of an electrolytic cell which makes use of a series current path and parallel fluid path. Neither the function, nor the structure of this unit is similar to the present invention.

U.S. Pat. Nos. 4,406,768 and 4,500,403 issued to King, disclose other electrochemical cell assemblies; in these units the electrodes do not span the entire width of the inner chamber. However, these units do make use of a series current and parallel fluid paths.

U.S. Pat. No. 5,549,812 issued to Witt, discloses a method of electrolysis which requires a pulsed current flow and sinuous fluid path. A pulsed current source is used to break down and chemically alter contaminants in order to form a flocculate within the fluid to be treated. After treatment, the flocculate is settled in a tank for removal from the fluid. However, the cell is constructed so as to be particularly difficult to disassemble for inspection and repair. Also, the fluid path moves in different directions across each plate within the cell.

U.S. Pat. No. 3,964,991 issued to Sullins, describes an apparatus for electrolytic flocculation (i.e. electrocoagulation) of suspended colloidal particles. This device is cylindrical in form, makes use of a single, centrally-disposed electrode for operation, and is very difficult to disassemble for cleaning after extended use.

German Patent Document DE 3641365C2 is an apparatus for the cleaning and treatment of contaminated water using "electroflotation," a process where iron and aluminum plates, configured as sets of cascaded electrodes, are consumed by electrolysis as waste water passes over them. This electrolytic process (termed herein as "electrocoagulation") can achieve flotation over a wide pH range without the addition of chemicals, resulting in clarification or cleaning of the water. During electroflotation, metals are oxidized in the waste water to form precipitates, emulsions are broken, and oil components are converted to foam. In practice, fine gas bubbles are produced in the waste water (an electrolyte) by electrolytic action between the electrodes, which form anodes and cathodes. Liberated oxygen serves to oxidize substances in the waste water. The release of metallic ions into the waste water provides flocculating agents which cause contaminants to fall to the bottom while gas bubbles may produce a foam bed at the top. A clean water phase forms between the upper foam bed and the heavier dirty component at the bottom of the fluid bed. In this particular apparatus, both iron and aluminum (which is more expensive than iron) are used as sacrificial electrode materials.

As illustrated by the background art efforts are continuously being made to develop improved devices for removing impurities from fluids. No prior effort, however, provides the benefits attendant with the present invention. That is, the process and apparatus according to the present invention substantially depart from conventional concepts and designs of the prior art, and in so doing, provide a means of causing particulate impurities within a fluid to cluster together to form larger particles for filtering by subsequent mechanical processes in an economical manner; provides a cell for electrocoagulation which obviates the need for numerous sealing gaskets, is easy to disassemble and clean, employs readily available parts and materials, is easily manufactured, and uses a minimum number of functional components; and includes a clarifier which is more effective than prior art clarifiers. Additionally, prior patents and commercial techniques do not suggest the present inventive combination of component elements arranged and configured as disclosed and claimed herein.

SUMMARY OF THE INVENTION

The present invention relates to a process for the treatment of industrial waste water by utilizing an electrocoagulative process to chemically bond with a molecule/particle in solution to change the molecule/particle from "in solution" to "in suspension" so the molecule can be flocculated and separated from the water as a contaminant, which may include heavy metals, dyes, oils, fats, solvents, salts, etc. The electrocoagulative process for treating industrial waste water comprises the steps of:

(a) passing low-pressure industrial waste water containing contaminants susceptible to flocculation and precipitation upon electrolysis of the waste water between electrodes of an electrocoagulation cell designed for long useful life and easy maintenance;

(b) subjecting waste water within the cell to electrolysis by energizing the electrodes with direct current, thereby breaking down and chemically altering contaminants to change the contaminants from in solution to in suspension in the electrolyzed water to form a sedimentable flocculate therein; and (c) separating the flocculate from the resulting cleaned water, using chemical flocculant additives (if needed) and a mechanical clarifier constructed to operate more effectively with greater ease of maintenance than that required by conventional clarifiers.

The invention also anticipates an apparatus for treating waste water which comprises: a pump for moving waste water through an electrocoagulation reactor cell; the cell itself, a de-foam tank to reduce the amount of bubbles present in clarified water, a clarifier having a floc mix chamber, a series of horizontally disposed slotted plates of varying lengths designed to follow a shallow inlet and steep outlet wall path, terminating in an outlet weir; and a recessed plate filter press to consolidate flocculated waste materials for disposal.

The electrocoagulation reactor cell of the present invention has ferrous electrode plates physically disposed so as to be parallel to one another, with a spacing fixed by holding slots which traverse the left and right cell walls. In other designs, the plates would also be aluminum, carbon, or of other materials depending on the waste being treated. The cell plates form a meandering guide path for waste water as it moves from the cell inlet to the cell outlet. All other fluid paths are sealed by mechanical abutting contact with a liquid sealant such as silicone being used between abutting surfaces of the outer walls of the reactor cell. Power to the cell is connected to every eleventh plate, by way of slots and holes cut into the plates with fluid-tight seals around the power links to every eleventh plate. The plates to which voltage is connected may be varied according to the design parameters of the particular system.

The clarifier of the present invention has three major containment areas for waste water which has undergone electrocoagulation: a floc mix chamber, the clarifier main body, and an outlet weir. The floc mix chamber has a baffle at the bottom to remove entrained air (passed on to the top of the clarifier) and ensure more thorough mixing of the liquid which passes through it.

The main body of the clarifier comprises a series of horizontally disposed slotted plates of varying lengths; each plate is of such a length that it follows the shallow inlet and steep outlet paths delineated by the clarifier bottom walls, which lead from the clarifier inlet, and to the clarifier outlet, respectively. The slots in the plates are of variable size, and provide a means of selecting a more or less turbulent flow along the fluid path.

Clarified liquid passes through the slots on to the outlet weir. Solids, which fall to the bottom of the clarifier main body, are drained by the operator and passed on to a filter press, where they are consolidated and taken to an appropriate disposal location.

The more important features of the invention have thus been rather broadly outlined in order that the detailed description that follows may be better understood, and the present contribution to the art better appreciated. There are, of course, additional features of the invention that will be described hereinafter forming the subject matter of the claims appended hereto. It should be appreciated by those skilled in the art that the disclosed specific methods and structures may be readily utilized as a basis for modifying or designing other methods and structures for carrying out the same purposes of the present invention. Such equivalent methods and structures do not depart from the spirit and scope of the invention as set forth in the appended claims.

It is to be understood that the invention is not limited in its application to the details of construction and arrangement of the components set forth in the following descriptive drawings. The invention is capable of other embodiments and of being practiced and carried out in various ways. In this same spirit, the phraseology and terminology employed herein should not be regarded as limiting.

Therefore, it is an object of the present invention to provide a new electrocoagulation process and apparatus which can be realized in a relatively small floor surface area.

It is another object of the present invention to provide a new electrocoagulation process and apparatus which may be easily and efficiently manufactured and marketed, being fabricated from readily available materials.

It is a further object of the present invention to provide a new electrocoagulation process and apparatus which is of a durable and reliable construction.

Yet another object of the present invention is to provide a new electrocoagulation process and apparatus which consumes a relatively small amount of power.

Still yet another object of the present invention is to provide a new electrocoagulation process and apparatus that requires minimal maintenance over its entire useful life.

It is also an object of the present invention to provide a new fluid reactor cell for causing particulate impurities within a fluid to cluster together to form larger particles which may be more easily separated by subsequent conventional mechanical processes.

It is another object of the present invention to provide a new fluid reactor cell which may be easily and efficiently manufactured and marketed, being made from readily available materials.

It is a further object of the present invention to provide a new fluid reactor cell which is, of a durable and reliable construction.

Yet another object of the present invention is to provide a new fluid reactor cell which consumes a relatively small amount of power.

It is another object of the present invention to provide a new fluid reactor cell which operates effectively under relatively low-pressure and low-velocity fluid flow conditions.

Still yet another object of the present invention is to provide a new fluid reactor cell that requires only minimal maintenance over its entire useful life, i.e. the cell operates for a relatively long time before any disassembly and cleaning is necessary.

It is another object of the present invention to provide a new wastewater clarifier which may be easily and efficiently manufactured and marketed, being made from readily available materials.

It is a further object of the present invention to provide a new wastewater clarifier which is of a durable and reliable construction, the plates of the clarifier may be individually removed while the system is running.

Yet another object of the present invention is to provide a new wastewater clarifier which consumes no electrical power.

Still yet another object of the present invention is to provide a new wastewater clarifier that requires only minimal maintenance over its entire useful life.

A still further object of the present invention is to provide a new wastewater clarifier that allows operator selection of turbulence along the fluid flow path from the clarifier inlet to the clarifier outlet.

It is an object of the present invention to provide a new wastewater clarifier having a baffled flocculant mixing chamber which acts to more thoroughly mix partially-cleaned liquid with added flocculent chemicals, while simultaneously removing entrained air from the liquid.

It is another object of the present invention to provide a new wastewater clarifier with a gently-sloped entry fluid path, and a steeply-sloped exit fluid path, each serving to more efficiently separate flocculated materials from the partially-cleaned fluid.

It is a further object of the present invention to provide a new wastewater clarifier which has a multiplicity of operator selectable drain hole locations.

BRIEF DESCRIPTION OF THE DRAWINGS

The above mentioned features and objects of the present invention will become more clearly understood from the following detailed description of the invention read together with the drawings in which.

DESCRIPTION OF THE PREFERRED EMBODIMENT

Figure 1:
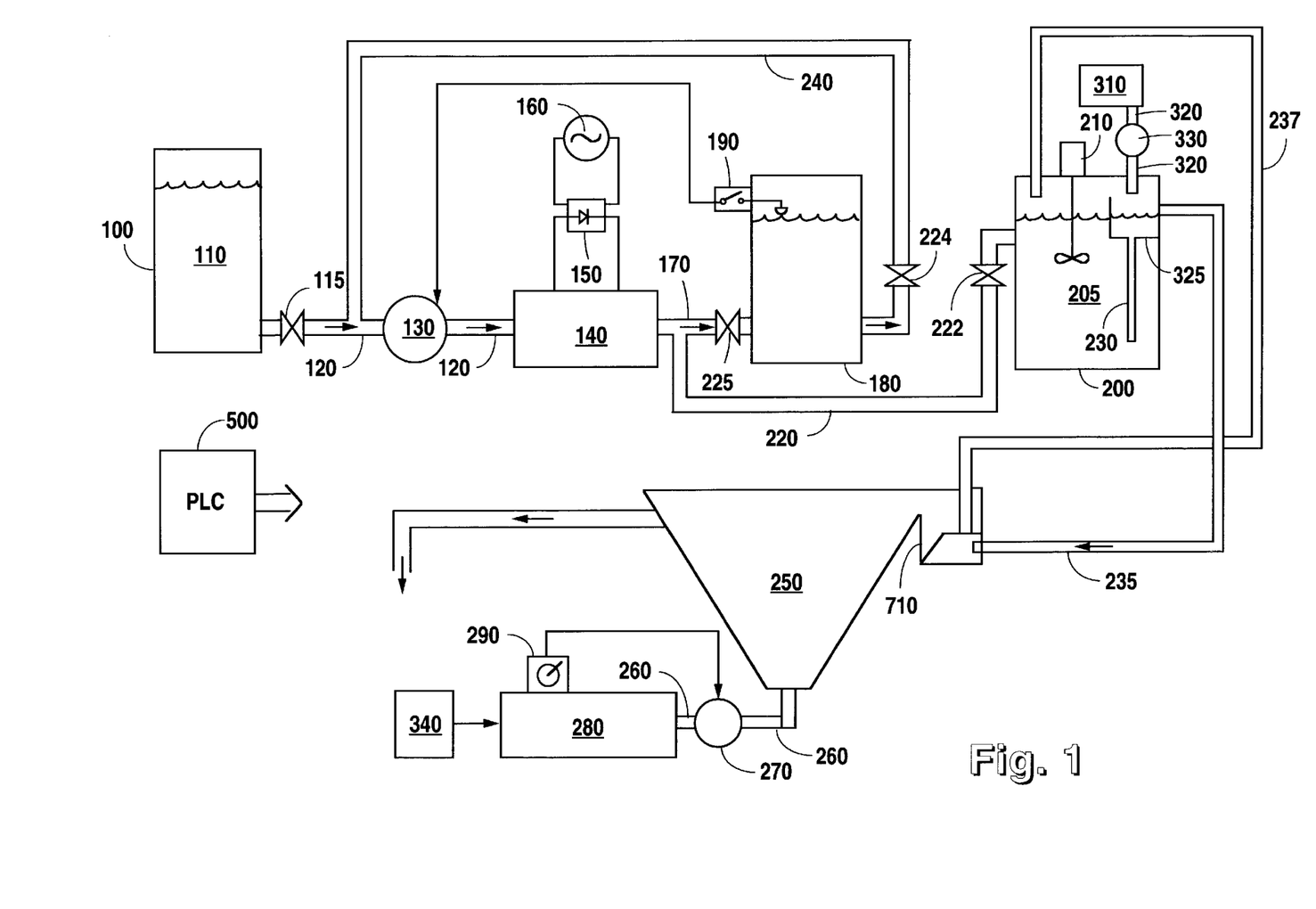
FIG. 1 is a schematic block diagram of the coagulative process of the present invention.

Turning now to FIG. 1, it can be seen that waste water 110 is pumped from a waste holding tank 100 byway of holding tank valve 115 (which must be open), waste water pump 130, and waste pipe 120 into electrocoagulation reactor unit 140. Waste water 110 may also be taken directly out of another process (not shown), as it is produced, instead of from waste holding tank 100. Pump 130, which is typically a diaphragm-type, low-pressure, low volume unit, is configured to operate at a pressure such that a constant volume of waste water 110 per time interval is moved into the inlet of reactor unit 140.

Reactor unit 140 may comprise a single electrocoagulation reactor cell, or as a series of such cells, depending on the amount and composition of particulate waste present in waste water 110. The more waste which is present, the more efficiently multiple cells, operating as a series-connected fluid path, can be employed. Rectifier 150 takes alternating current from an appropriate power source 160, rectifies it, and provides direct current to the electrical input terminals of reactor unit 140. The amount of voltage and current required depends on the volume of waste water to be processed, the type and concentration of contaminants, and the physical size of the reactor unit 140. To provide for uniform wear, the voltage from the rectifier 150 is reversed every twenty to thirty minutes. Typically, for a single 25 gal./min. reactor unit 140, only 150 amperes at 25 volts will be required. This is in contrast to prior art cells, which required approximately 600 amperes for the same voltage and flow rate. Of course, if several electrocoagulation cells are used in a series fluid path, then rectifier 150 could be connected in parallel to the electrical input terminals of each cell, or a separate rectifier could be employed for each. For the remainder of this description, the reactor unit 140 will be described as if it comprises only a single electrocoagulation cell.

Figure 2:
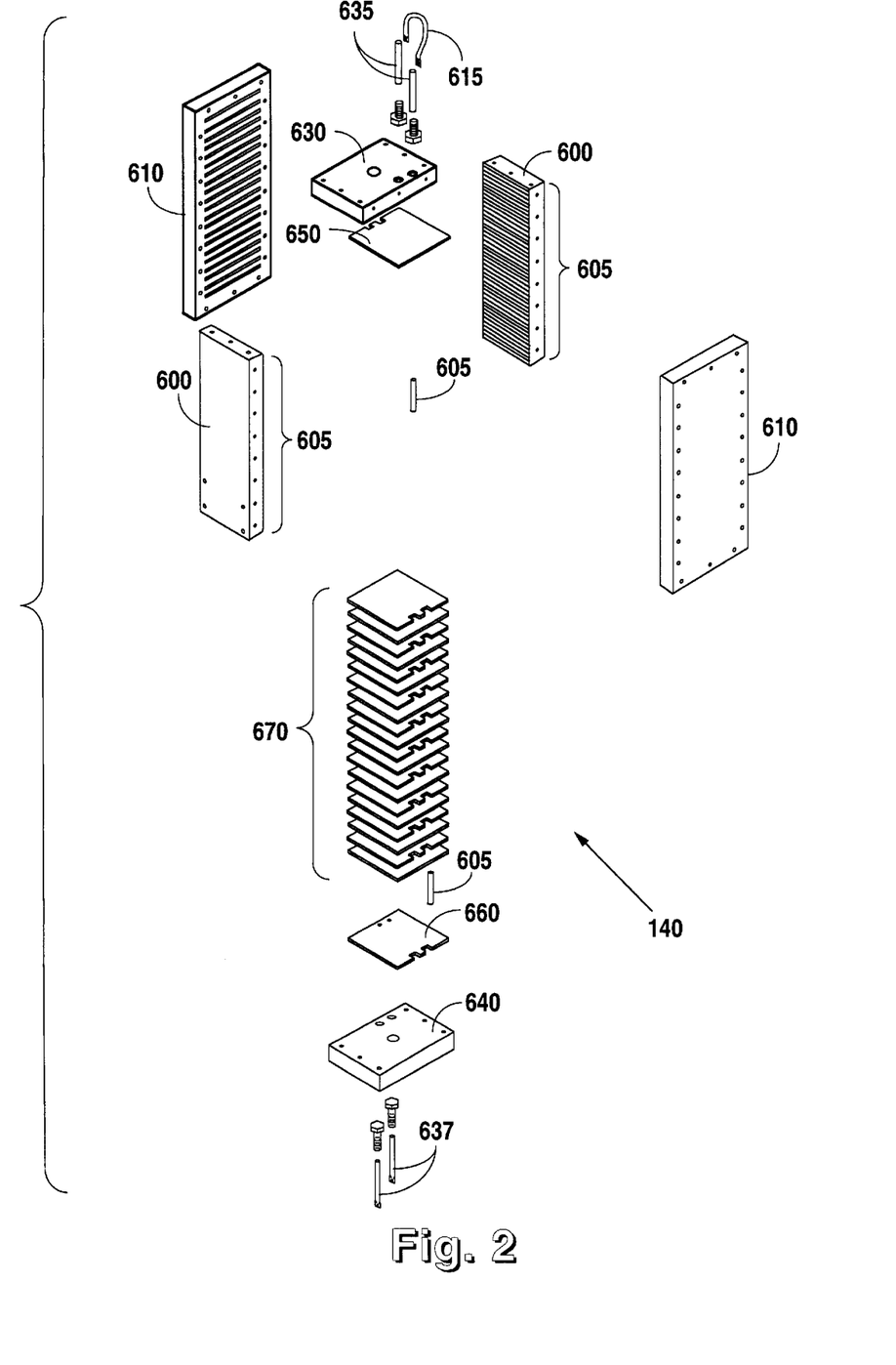
FIG. 2 is a perspective assembly view of the electrocoagulation reactor cell apparatus of the present invention.
Figure 3:
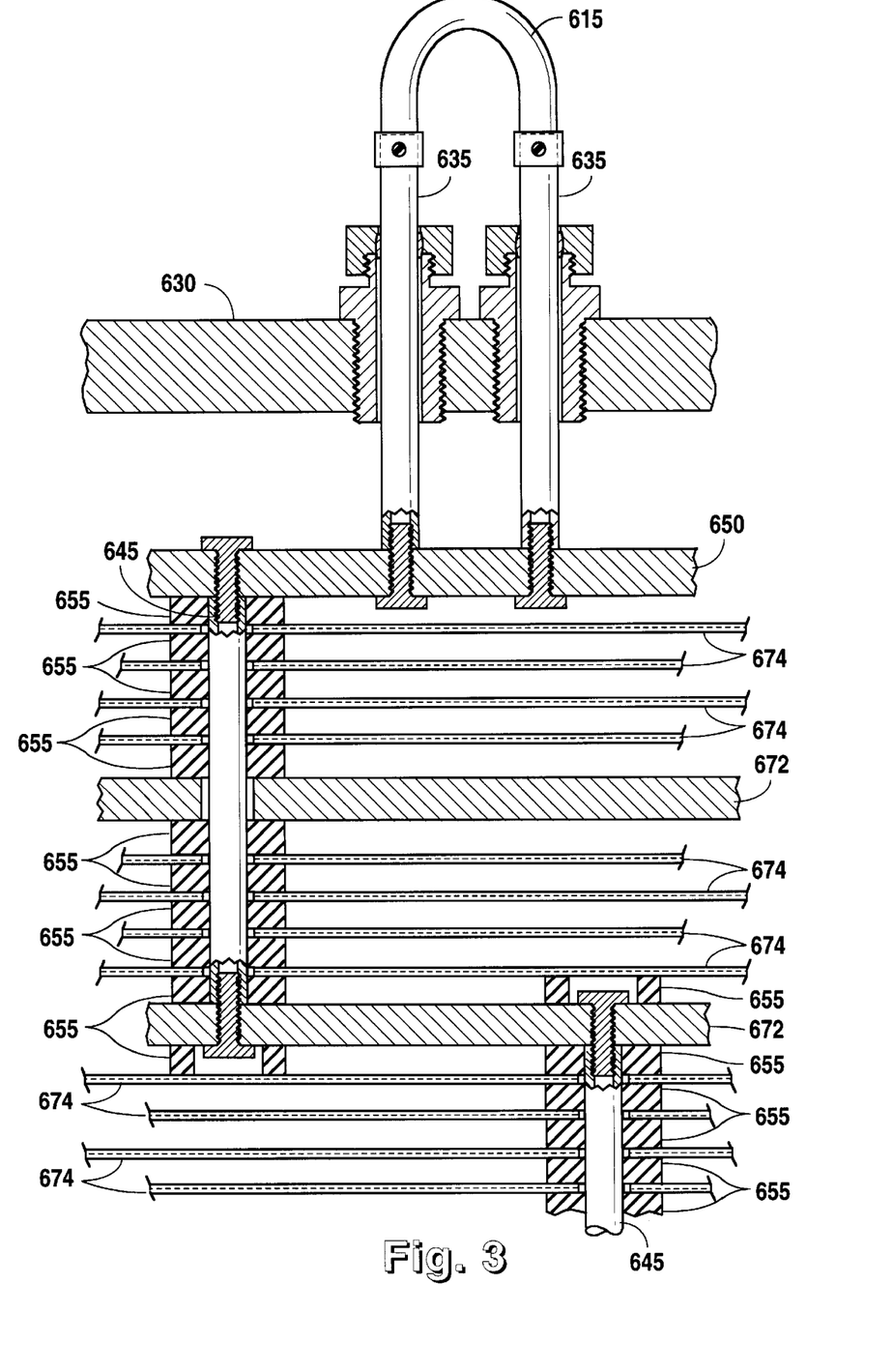
FIG. 3 is a detailed view of the positive electrode connections to the electrocoagulation reactor cell apparatus of the present invention.
Figure 4:
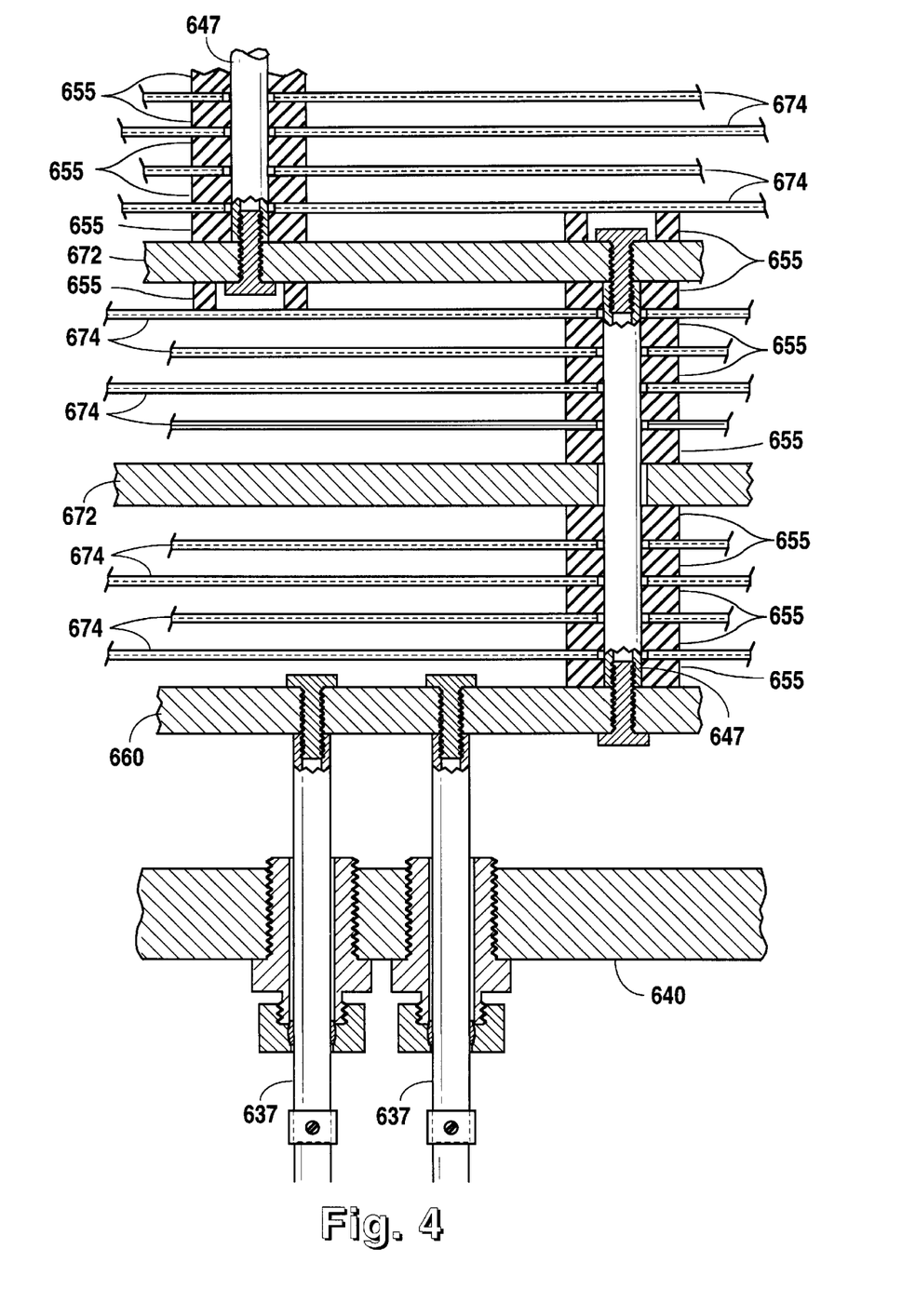
FIG. 4 is a detailed view of the negative electrode connections to the electrocoagulation reactor cell apparatus of the present invention.

Turning now to FIG. 2, it can be seen that reactor unit 140 comprises a number of sacrificial metal plates 670, most commonly made of iron or hot-rolled steel. Copper, carbon, aluminum, metal-impregnated plastics, ceramics, and other materials which may or may not donate ions under the influence of electrolysis can also be used. Plates 670 are typically arranged in a vertically-stacked arrangement, with large surfaces parallel to each other. The plates to which power is connected is a thick plate 672 with the intermediate plates being thin plates 674. In the arrangement as shown in FIGS. 3 and 4, every fifth plate is connected to power and is a thick plate 672. The remaining plates are all thin plates 674. The reason the power plates are thicker is because they combine more with the contaminants in solution and thereby wear faster than the other plates. A void exists between each of the plates 672 and 674. In the 25 gal./min. reactor unit shown, there are preferably a total of 46 plates 670.

Plates 670 can also be arranged so that the large surfaces are non-parallel (i.e. converging, diverging, or in a combination of parallel and non-parallel arrangements). Non-parallel arrangements are believed to provide more complete electrocoagulation of waste components within waste water 110, as a result of increased turbulence and varying electrical fields over the surface of each plate 670. While described, the non-parallel arrangements are not shown in the drawings.

FIGS. 3 and 4 show the positive and negative power input terminal connections to reactor unit 140, respectively. Each connection is symmetrical, with, referring now to FIG. 3, the positive voltage from rectifier 150 being connected directly to positive terminal 615, passed through reactor unit lop plate 630 by way of power studs 635, and applied to the first, eleventh, twenty-first, thirty-first and forty-first plates 670 within the body of reactor unit 140, by a series of positive power connector links 645, beginning with top electrode 650 (counted as the first plate 670 from the top of reactor unit 140). This arrangement of connections may be varied according to the results desired. Different voltage gradients can be created by connecting to different plates.

Similarly, as shown in FIG. 4, the negative rectifier 150 voltage is connected directly to negative terminal wires 617, passed through bottom plate 640 and connected to bottom electrode 560 (counted as the first plate 670 from the bottom of the reactor unit 140) by way of negative power studs 637. The negative power supply voltage is then applied to the eleventh, twenty-first, thirty-first and forty-first plates 670 within the body of reactor unit 140, by a series of negative power connector links 647, beginning with bottom electrode 660. Assuming a parallel arrangement of plates 670, the voltage provided by rectifier 150 will be equally divided between plates of opposite polarity. The voltage between plates can be changed by changing the number of plates between power connections.

Figure 5:
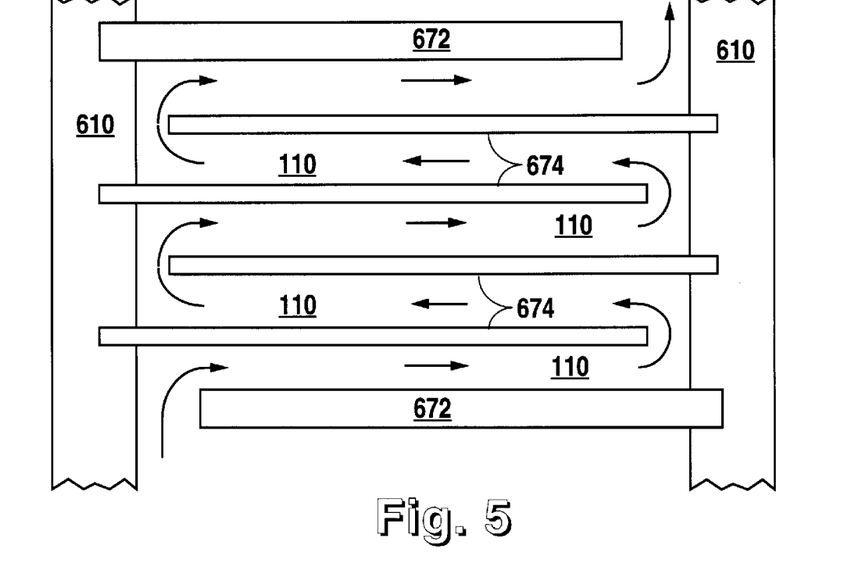
FIG. 5 is a cross-sectional view of the fluid flow path through the electrode plates of the electrocoagulation reactor cell apparatus of the present invention.

Waste water 110 passes in a serpentine route through the voids between the plates as a thin film, as illustrated in FIG. 5. Seals 655, preferably made of latex tubing or an equivalent material, ensure that a fluid-tight seal exists between plates 670. Not all plates 670 need be connected directly to the power supply; in fact, only 10 thick plates 672 out of a total of 46 plates 670 are so connected. Each plate 670 in this arrangement is thus more positive or more negative than its neighboring plate 670, resulting in a differential voltage between adjacent plates, impressing a voltage and current on the space between the plates via conduction by waste water 110. Rectifier 150 reverses the polarity to the plates at selectable intervals, preferably twenty to thirty minutes, to ensure a uniform rate of plate erosion and to clear the plates of unwanted gasses and other deposits. Plates 672, connected directly to rectifier 150 by way of power studs 635 and 637, and power links 645 and 647 are approximately ⅜" thick, as opposed to plates 674, which are only about ¼" thick, and not connected directly to rectifier 150. Directly connected thick plates 672 erode much more quickly than thin plates 674; the variation in thickness provides more even "wear" throughout the reactor unit 140, and a longer operational lifetime.

Referring to FIG. 2, reactor unit 140 with open side plates 600, closed side plates 610, top plate 630, and bottom plate 640 is fabricated from approximately 2.0" thick poly-vinyl chloride (PVC) material. Other nonconducting materials with the required rigidity, pressure-resistant liquid sealing ability, and non-corrosive when exposed to the fluid to be cleaned, can also be used. Reactor unit 140 is constructed to prevent waste water 110 leakage between the plates 670 at open side plates 600 by direct abutting contact with plates 670 as they fit into slots 605. Reactor unit 140 is constructed to preclude similar leakage at each of closed side plates 610 by means slots similarly disposed at one end of each plate, allowing an open path for fluid at the opposite end of each plate, thus defining the serpentine path. Top plate 630 and bottom plate 640 and closed side plates 610 are simply bolted to open side plates 600. Common sealing material is applied between mating surfaces to render reactor unit 140 water-tight because only low-pressure fluid flow is required for effective operation of reactor unit 140. A common sealer that may be used is a silicone type sealer. Prior art units were operated under the assumption that constant volume, high pressure fluid flow (e.g. 60 psi) was desirable. In actuality, more waste can be removed per unit-time from waste water 110 with low-pressure (e.g. 10–20 psi), low-volume flow. This also allows reactor unit 140 to operate at much lower power levels than prior art reactor cell units, as noted above. The combination of low power operation and low-pressure, low-volume fluid flow also reduces the amount of maintenance required to keep reactor unit 140 operating effectively. Prior art cells with similar volume treatment capability could only operate for approximately 40–60 hours before cleaning was needed. The present invention has operated for more than 400 hours before reduced operational efficiency was noted.

Regular maintenance and cleaning of reactor unit 140 is greatly simplified by the above-mentioned construction The operator need only unbolt closed side plates 610 from open side plates 600 to directly access all sacrificial electrode plates 670. Instead of O-rings, a thin layer of adhesive gasket material, preferably RTV® may be applied, making re-assembly of reactor unit 140 a matter of spreading RTV® onto the edges of closed side plates 610 and bolting them back on to the open side plates 600.

Waste water 110, after reaction within reactor unit 140, is discharged into the first process vessel 180 by way of discharge pipe 170. (See FIG. 1) If a batch of waste water 110 versus a continuous flow is being treated, float switch 190, which monitors the fluid level in the first process vessel 180, stops the pump 130 when the first process vessel 180 is full. The operator may then select the final destination of the partially treated water by manually changing valve settings (i.e. open or closed) for holding tank valve 115, de-foam valve 222, and recirculate valve 224 and batch valve 225.

Waste water 110 which is sufficiently treated after passing through reactor unit 140 will be discharged as treated water 205 directly to de-foam tank 200 by way of treated waste pipe 220 and open de-foam valve 222 (recirculate valve 224 and batch valve 225 must be closed). Waste water 110 which requires further electrocoagulation treatment is recirculated from the first process vessel 180, by way of opening recirculate valve 224 and batch valve 225, recirculation piping 240, and pump 130, to reactor unit 140. In this case, holding tank valve 115 and de-foam valve 222 will be closed. To provide additional treatment capacity, a multiplicity of holding tanks 180 can be used for temporary storage of waste water 110 as it is treated and circulated through reactor unit 140. That is, additional piping and valves can be provided to allow continuous circulation between the reactor unit 140 and the first process vessel 180, or to a second process vessel (not shown) for batch recirculation between the first process vessel 180 and the second process vessel. Treatment continues in this fashion via tank/valve/pipe selection until the waste water 10 is fully treated, at which time the treated water 205 will be sent to the de-foam tank 200.

Agitator 210 in the de-foam tank 200 stirs treated water 205. Gasses trapped in treated water 205 are thereby expelled, allowing the de-gassed waters to settle toward the bottom of de-foam tank 200, where they exit the tank by traveling up overflow pipe 230 from near the bottom of de-foam tank 200 and into attached de-foam over-flow weir 325.

A small amount of chemical flocculant maybe added via floc tank 310, floc pipe 320 and floc pump 330 to the treated water 205 before it exits the de-foam overflow weir 325 and passes on to the clarifier 250. The flocculant, which is preferably an anionic polymer, or similar commonly available formulation well known in the art, collects additional particles and metal ions in the treated water 205 as the water moves downward from the de-foam overflow weir 325, then horizontally through de-foam pipe 235 to the floc mix chamber 710 of the clarifier 250. Of course, the addition of chemical flocculant is an aid to more rapid coagulation of waste, and is not necessarily required to effect the process of the present invention. Those experienced in the art of waste removal from fluids by floccuation, especially with regard to heavy metal waste components, can readily determine the need for addition of chemical flocculant to the waste stream, depending on the measured quantity of individual waste components present in the treated water 205 fluid stream. That is, lateral coagulation and flocculation of waste solids will occur, and may be sufficient for treatment purposes, even if chemical flocculant is not added.

Figure 6:
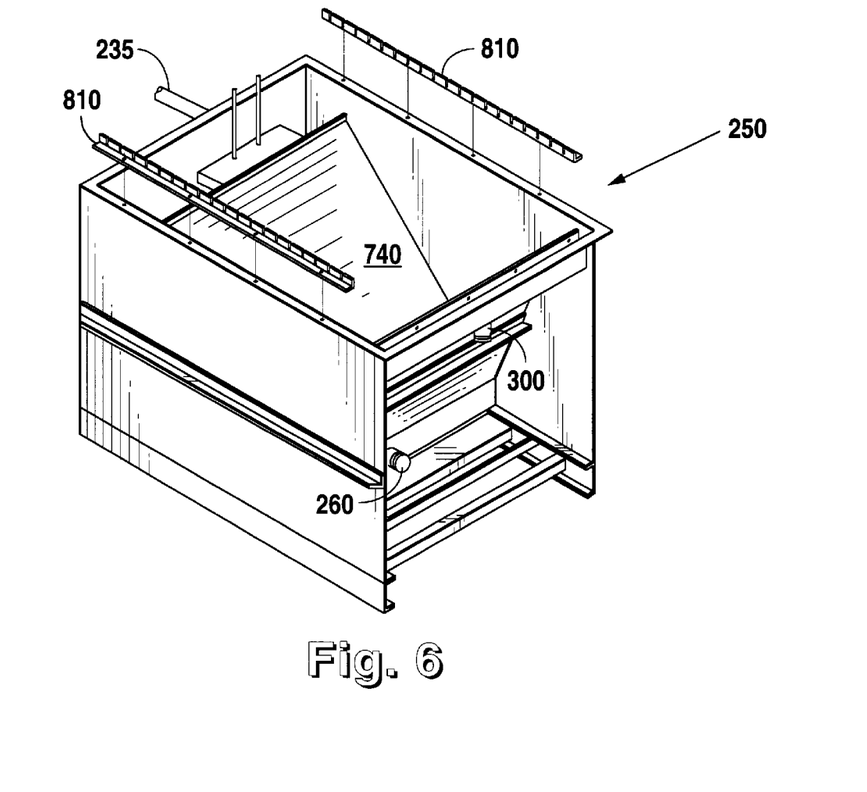
FIG. 6 is a perspective view of the mechanical clarifier apparatus of the present invention.
Figure 7:
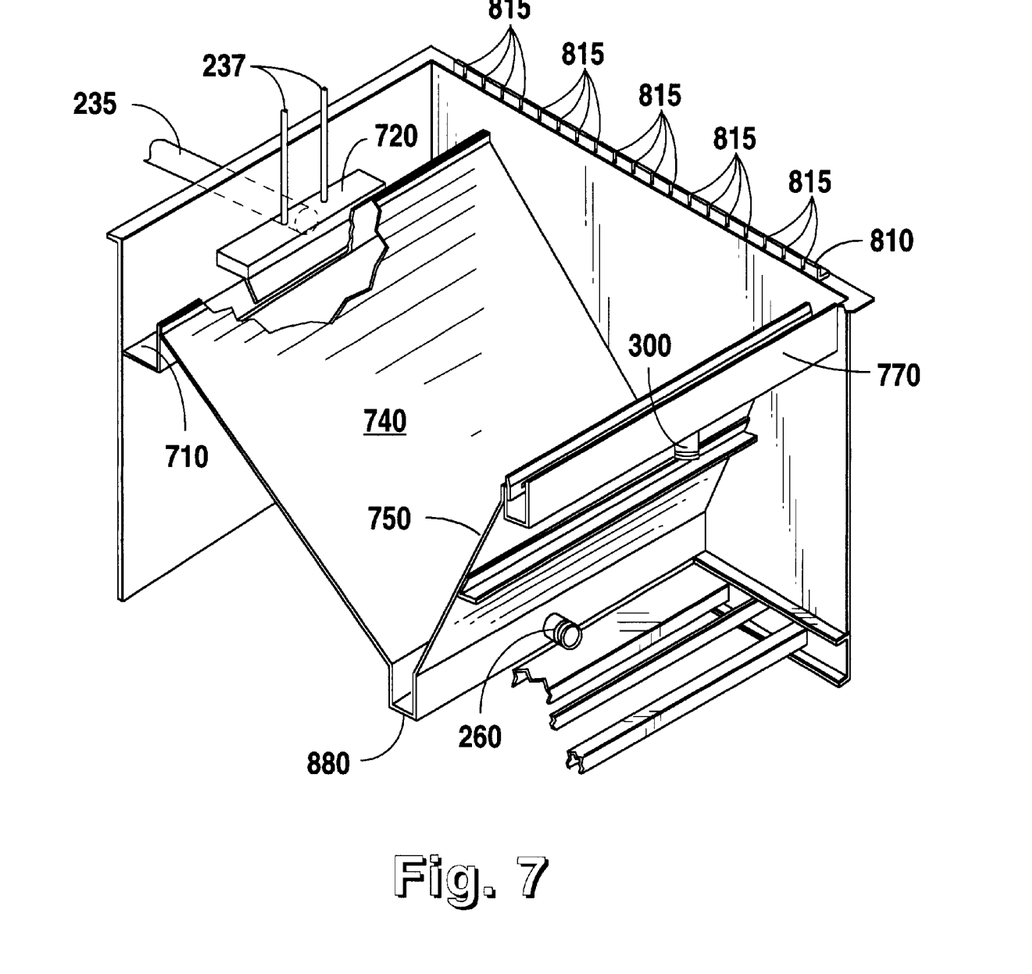
FIG. 7 is a cut-away side view of the inlet and outlet segments of the mechanical clarifier apparatus of the present invention.
Figure 9:
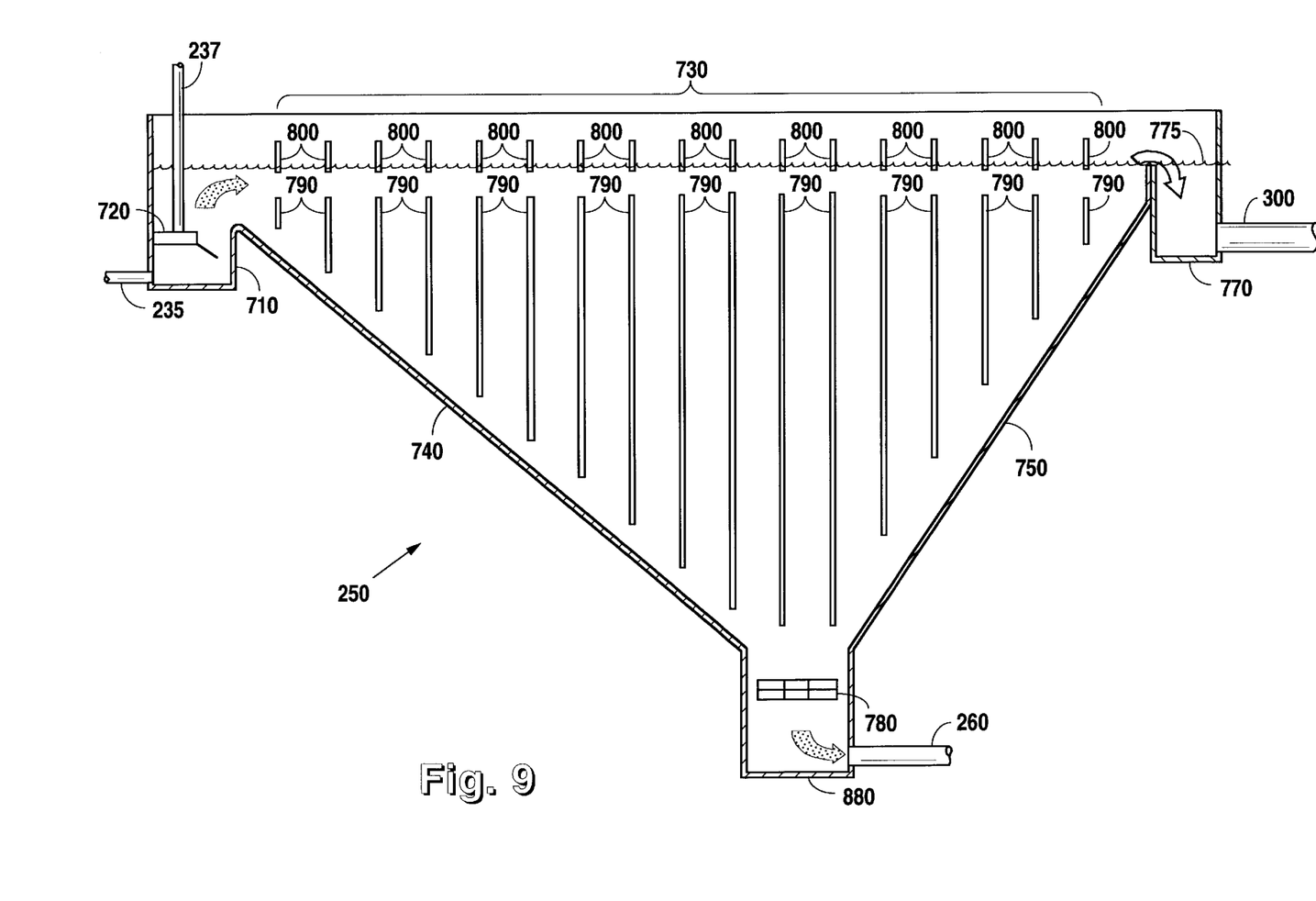
FIG. 9 is a cut-away side view of the blocking plates and notches within the mechanical clarifier apparatus of the present invention.

Turning now to FIGS. 6, 7, and 9, the improved clarifier 250 of the present invention can be seen. The de-foam pipe 235 delivers the fluid 110 to the clarifier 250 below a baffle 720. The baffle 720 at the bottom of the floc mix chamber 710 of the clarifier 250 ensures thorough mixing and removes any entrained air from the incoming liquid, passing bubbles, foam, and air to the top of the chamber 710 and back into the de-foam tank 200 via bubble pipe 237 (see FIG. 1), without disturbing the slowly moving coagulated materials in the floc mix chamber 710. As liquid fills the floc mix chamber 710 and the coagulated solids attempt to settle, a dense floc bed is formed at the bottom of the floc mix chamber 710, through which all liquid and coagulated waste must pass, ensuring adequate contact between the incoming liquid, flocculant, and coagulated waste, to better remove all available metal particles and ions.

The treated water 205 coming into the floc mix chamber 710 overflows into the main bay 730 of the clarifier. The clarifier main bay 730 has a shallow slope 740 on the inlet end, to minimize turbulence caused by falling coagulated waste, and a steep outlet slope 750 to help ensure that coagulated waste will not approach the clarifier outlet weir 770. The shallow slope 740 would be 45 degrees or less with respect to the horizon and the steep outlet slope 750 will be greater than 55 degrees with respect to the horizon. A number of blocking plates 760, shown in FIGS. 8a and 8b, hang vertically from the top of the clarifier main bay 730, with a predetermined horizontal spacing between them. Plates 760 are of varying lengths, so that the bottom of each plate reaches to within a predetermined distance of clarifier slopes 740 and 750, and the drain 780. Each plate 760 spans the full width of the clarifier, and each plate comprises three major components: the plate wall 790, the slot top 800, and the plate hanger 810. The wall 790 forms the major portion of each plate 760, and is designed to prevent horizontal movement of fluids below the slot top 800, creating a zone of stillness from which coagulated solids may fall as treated water 205 flows from the clarifier floc mix chamber 710 to the clarifier outlet weir 770.

The slot top 800 defines the height of a slot 820 which runs the full width of the clarifier near the top of each plate wall 790. The slot top 800 is designed for use in any of three positions, seen in FIG. 8c, and can be arranged as a vertical barrier, or with leading or trailing angles. The orientation of the slot top 800 is selected based on the characteristics of the solids being separated, and the amount of turbulence desired in the wake of each slot 820, the vertical arrangement 822 giving a median amount of turbulence past the slot 820, the leading arrangement 824 giving more turbulence past the slot 820, and the trailing arrangement 826 giving the least turbulence past the slot 820.

Figure 8A:
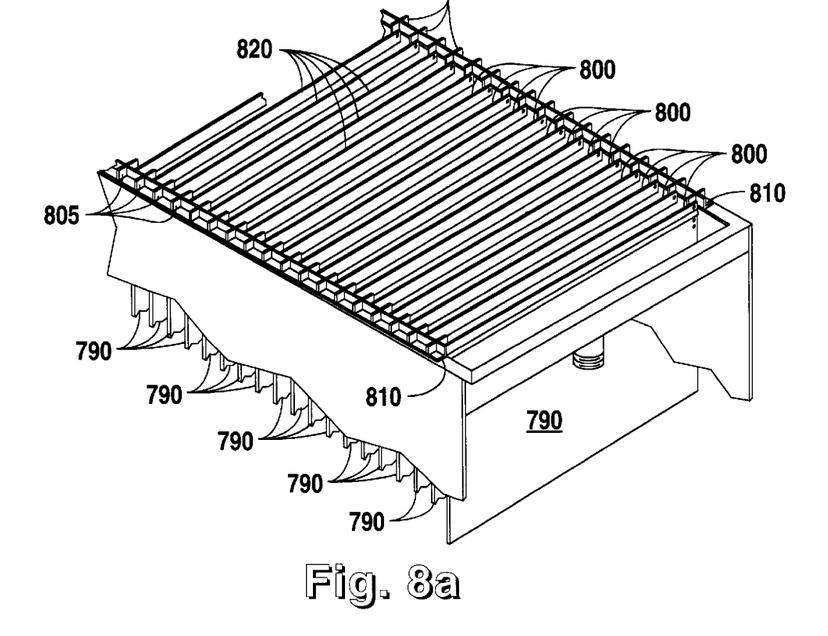
FIGS. 8a, and 8b and 8c are perspective and side views of the blocking plates within the mechanical clarifier apparatus of the present invention.
Figures 8B, 8C:
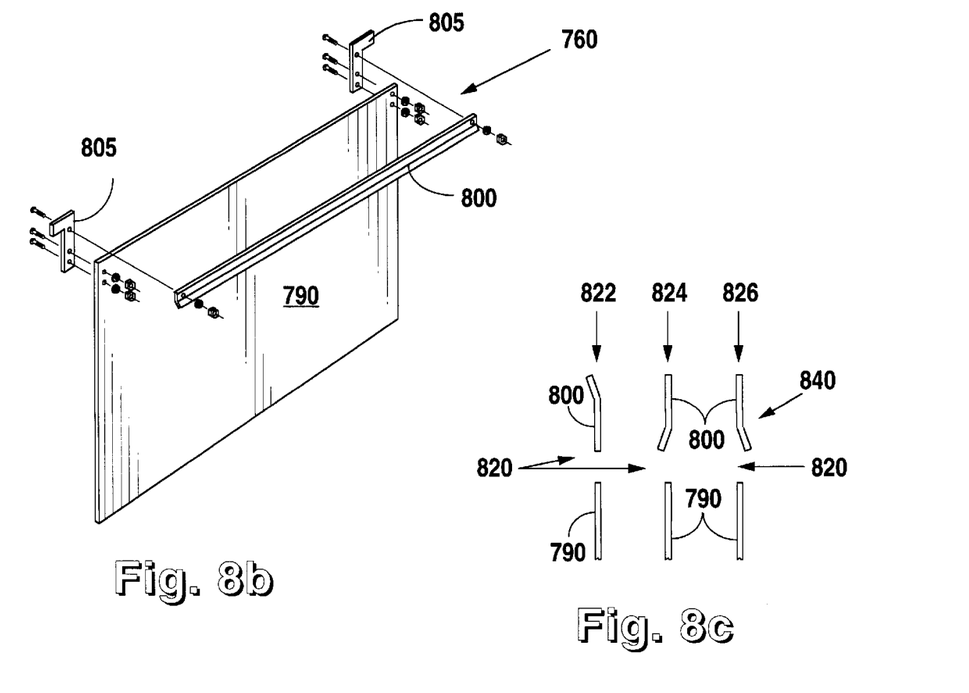

A pair of plate ears 805 tie together one plate wall 790 and its corresponding slot top 800. The connection between the wall 790 and slot top 800 determines the notch 820 height, and the height of the blocking plate 760 assembly above the clarifier slopes 740 and 750, and the drain 780. The ears 805 connect the plate wall 790 to the slot top 800 so that the upper edge of the slot top 800 protrudes above the fluid level 775 of the filled clarifier 250. A series of holding slots 815 in plate hangers 810 mounted on the top of the clarifier main bay 730 receive individual plate ears 805, determine the spacing between blocking plates 760, and hold the blocking plates 760 in vertical alignment.

Exemplary dimensions for a 10 gal./min. clarifier include a clarifier main bay of between approximately 329 and 340 gallon capacity, 19 blocking plates, each with a slot 820 opening measuring approximately ¾ inches high and 44 inches wide. Each blocking plate 760 is spaced approximately 2.9 inches apart from the next blocking plate 760, and the total plate wall area is approximately 119.125 square feet. The floc mix chamber 710 should be able to contain approximately 43 gallons of fluid.

As the coagulated solids and treated water 205 move from the clarifier floc mix chamber 710, across the clarifier main bay 730, and on to the clarifier outlet wier 770, they pass through the individual slots 820 formed in plates 760 by the connection between plate wall 790, plate ears 805, and slot top 800. Heavy materials (i.e. coagulated waste materials) tend to fall below the slot 820 and continue to the bottom of the clarifier 250, coming to rest at the clarifier drain 780. Floating materials are stopped by the slot top 800 of each succeeding plate along the way from the floc mix chamber 710 to the outlet wier 770. Floating materials are held captive by the their tendency to float in the fluid above the slot 820 until they develop sufficient mass and density to fall into, then below, the level of the slot 820 in the blocking plates 760. Treated water 205 continues to move horizontally until it passes over the outlet wier 770, and on into the drain pipe 300.

Figure 10:
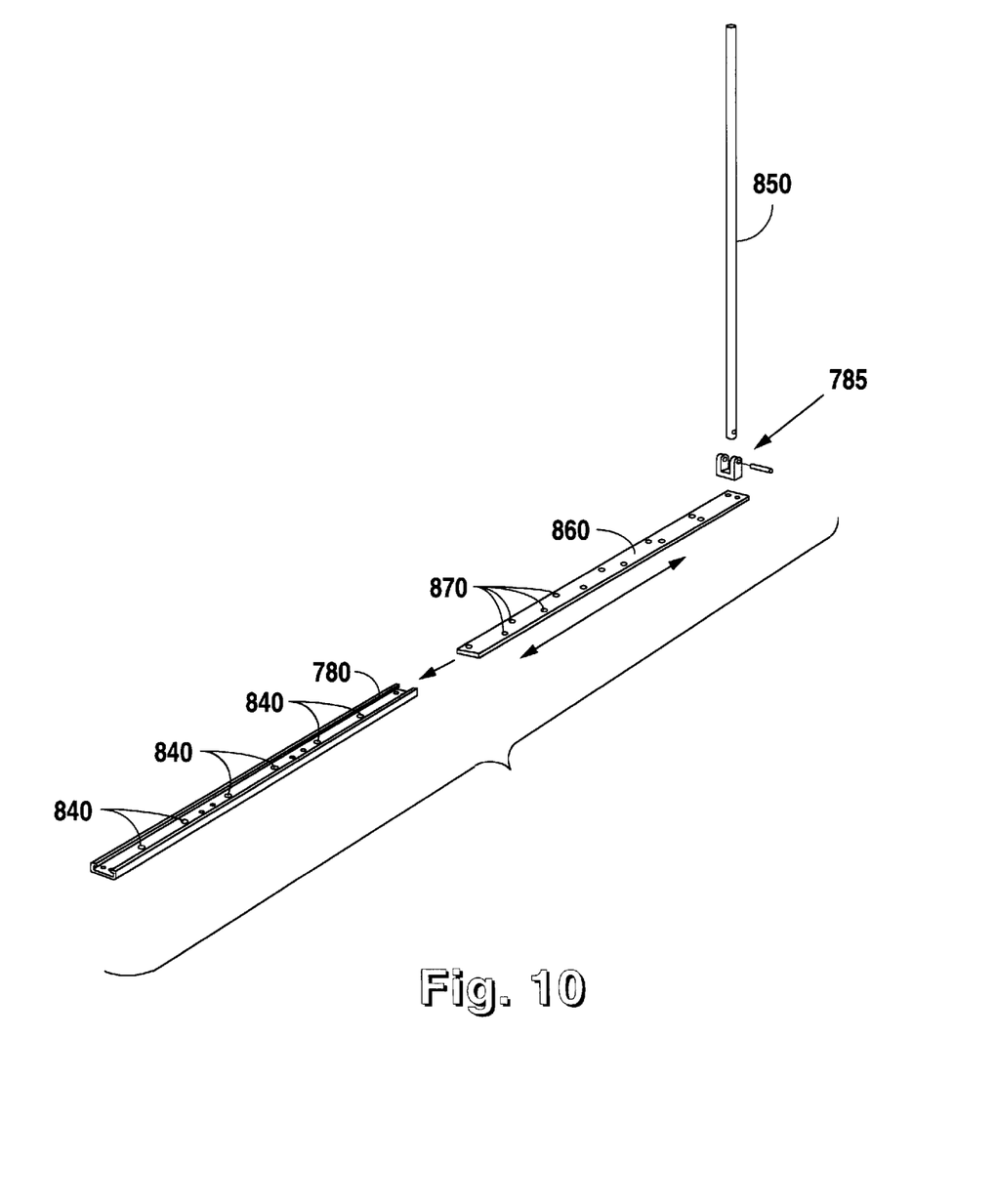
FIG. 10 is a perspective view of the drain mechanism within the mechanical clarifier apparatus of the present invention.

Turning now to FIG. 10, it can be seen that six drain holes 840 are located in drain 780, evenly spaced across the width of the clarifier bottom 880. The seven-position slide valve handle 850 allows the operator to select which of the holes 840 will be used to remove the collected solids by sliding the drain cover 860 across the drain 780 via movement of hinge assembly 785 to expose alternating valve holes 870, allowing falling coagulated waste materials to continue to drop through individually selected drain holes 840 onto the clarifier bottom 880. Six of the valve handle 850 settings will act to open a single drain hole 840, while the seventh setting opens all six holes 840 at the same time.

Coagulated solids which have fallen to the clarifier bottom 880 are then pumped into recessed plate filter press 280 via solids pipe 260 and filter press pump 270 (See FIG. 1). The filter press 280 is operated whenever there are sufficient solids in the press for efficient separation, as determined by the operator, as is well known in the art. The filter press pump 270 fills the chambers of the filter press 280 until the retained solids cause pumping pressure to increase to a predetermined amount, as measured by a pressure gauge 290 for a predetermined period. Typical pressures and time periods for a 2.5 cubic feet capacity press are 40–100 psi and 60 seconds. When these settings are reached, material is no longer pumped from clarifier 250 into filter press 280. Pump 270 is turned off, and air supply 340 is used to introduce air at a predetermined pressure, for a predetermined time period, into filter press 280 so as to force remaining liquid from press 280. Typical values of pressure and time are 40 psi for 30 minutes for a 2.5 cubic feet capacity press, respectively. Once the chambers of press 280 have been filled, and excess liquid removed, press 280 may be opened to eject accumulated solids.

Although the invention has been described with reference to specific embodiments, this description is not meant to be construed in a limited sense. Various modifications of the disclosed embodiments, as well as alternative embodiments of the invention, will become apparent to persons skilled in the art upon the reference to the description of the invention. It is, therefore, contemplated that the appended claims will cover such modifications that fall within the scope of the invention.

We claim:

1. An electrocoagulation process for treating waste water containing undesirable materials in solution comprising the following steps:

passing said waste water through a reactor cell having a plurality of positive and negative plates and intermediate plates dispersed therebetween;

apply a voltage to said positive and negative plates, said intermediate plates creating intermediate voltages therebetween;

reacting said undesirable materials with said plates to form suspended particles in said waste water;

moving said waste water with said suspended particles to a defoam tank;

agitating said waste water and said suspended particles to expel gases trapped therein;

removing said suspended particles from said waste water by flowing said waste water through a clarifier which causes said suspended particles to drop out of said waste water;

expelling said waste water from said clarifier after completion of said above steps; and extracting from said clarifier said suspended particles removed from said waste water.

2. The electrocoagulation process for treating waste water containing undesirable materials in solution as recited in claim 1, wherein, after said moving step, a chemical flocculant is added to said waste water to cause said suspended particles to collect together.

3. The electrocoagulation process for treating waste water containing undesirable materials in solution as recited in claim 2 wherein said removing step includes exiting said waste water with suspended particles from said defoam tank through an overflow weir, said overflow weir drawing said waste water with said suspended particles from near a bottom of said defoam tank.

4. The electrocoagulation process for treating waste water containing undesirable materials in solution as recited in claim 1 includes as a first step determining the type of said undesirable materials in said waste water, arranging spacing and number of said intermediate plates between said positive and negative plates to yield said intermediate voltage most desirable for said reacting step to form suspended particles.

5. The electrocoagulation process for treating waste water containing undesirable materials in solution as recited in claim 4 wherein thickness of said intermediate plates are less than said positive and negative plates so that all plates corrode away at approximately the same time.

6. The electrocoagulation process for treating waste water containing undesirable materials in solution as recited in claim 4 wherein said negative and positive plates vary in spacing to give varying potentials therebetween from said voltage.

7. The electrocoagulation process for treating waste water containing undesirable materials in solution in claim 1 wherein said clarifier has an inlet slope of less than 45 degrees and an outlet slope of greater than 55 degrees.

8. The electrocoagulation process for treating waste water containing undesirable materials in solution as recited in claim 7 wherein said clarifier has substantially vertical clarifier plates extending downward and terminating just above said inlet slope or said outlet slope to allow a small space therebetween.

9. The electrocoagulation process for treating waste water containing undesirable materials in solution as recited in claim 8 wherein said clarifier plates have a slot running substantially thereacross just below the level of said waste water in said clarifier, edges of said slot being varied to vary turbulence desired in said clarifier.

10. The electrocoagulation process for treating waste water containing undesirable materials; in solution as recited in claim 1 wherein said removing step includes a sub-step of trapping bubbles below a baffle before said flowing of said waster water through said clarifier, exhaust conduit removing said bubbles from said baffle.

11. The electrocoagulation process for treating waste water containing undesirable materials in solution as recited in claim 1 further including in said extracting step a sub-step of drawing said suspended particles from a bottom of said clarifier, exact point of said drawing being varied by a sliding valve to prevent bridging by said suspended particles against sides of said clarifier.

12. The electrocoagulation process for treating waste water containing undesirable materials in solution as recited in claim 11 wherein said suspended particles extracted from said clarifier are collected in a filter press and subsequently dewatered.

13. An electrocoagulation system for removing contaminants from waste effluent comprising:

means for collecting said waste effluent containing said contaminants;

reactor in fluid flow connection with said collecting means for receiving therein said waste effluent containing said contaminants, said reactor having a plurality of substantially parallel electrolytic plates contained therein, said electrolytic plates having a plurality of positive and negative plates with a plurality of intermediate plates interspersed therebetween;

voltage source connected to said positive and negative plates for applying a voltage therebetween, said voltage causing said contaminants to react with said electrolytic plates to change from in solution to in suspension in said waste effluent;

defoam tank for receiving said waste effluent and contaminants from said reactor;

agitator in said defoam tank for stirring said waste effluent to allow air trapped therein to rise to the surface and escape;

weir for drawing said waste effluent and contaminants from near a bottom of said defoam tank; and a clarifier for receiving said waste effluent and said contaminants from said weir, said clarifier separating said contaminants contained in suspension from said waste effluent.

14. The electrocoagulation system for removing said contaminants from said waste effluent as recited in claim 13 wherein said reactor has a housing that may be opened for removal of electrolytic plates by opening opposing sides, said electrolytic plates being maintained in slots in said housing for sliding in or out.

15. The electrocoagulation system for removing said contaminants from said waste effluent as recited in claim 14 wherein the number of said intermediate plates and said positive and negative plates are changeable by said opening of said opposing sides of said reactor and, after disconnecting links through which said voltage source may be received, sliding said electrolytic plates along said slots in which said electrolytic plates are maintained during operation of said electrocoagulation system, positioning and number of said intermediate plates and said positive and negative plates being determined by the type of said contaminants being removed from said waste effluent.

16. The electrocoagulation system for removing said contaminants from said waste effluent as recited in claim 14 wherein said electrolytic plates vary in thickness so that positive and negative plates will corrode away at approximately the same time as said intermediate plates.

17. The electrocoagulation system for removing said contaminants from said waste effluent as recited in claim 13 wherein a flocculant is added before said waste effluent is received in said clarifier, said flocculant causing particles of said contaminant in said waste effluent to collect together.

18. The electrocoagulation system for removing said contaminants from said waste effluent as recited in claim 13 wherein said clarifier has inlet sloped walls of less than 45 degrees and outlet sloped walls of greater than 55 degrees.

19. The electrocoagulation system for removing said contaminants from said waste effluent as recited in claim 18 wherein said clarifier has clarifier plates hanging from side walls of said clarifier and terminating just above said inlet sloped wall or said outlet sloped wall.

20. The electrocoagulation system for removing said contaminants from said waste effluent as recited in claim 19 wherein said clarifier plates have slots extending horizontally just below the top of said waste effluent in said clarifier, said slots being variable to vary turbulence of said waste effluent therethrough to cause said suspended contaminants to precipitate out of said waste effluent.

21. The electrocoagulation system for removing said contaminants from said waste effluent as recited in claim 13 wherein said clarifier has a baffle located above where said waste effluent is received in said clarifier, said baffle trapping bubbles therein for removal from said waste effluent.

22. The electrocoagulation system for removing said contaminants from said waste effluent as recited in claim 13 wherein said clarifier has a sliding valve at the bottom thereof to vary where said contaminants are extracted from said clarifier.

23. The electrocoagulation system for removing said contaminants from said waste effluent as recited in claim 22 wherein a compression filter receives said contaminants from said sliding valve for filtration and removal.

24. A reactor for use in removing contaminants from a waste effluent, a source of voltage being available for connection to said reactor, said reactor comprising:
   a non-conductive housing;
   parallel slots cut on an inside of first opposing walls of said non-conductive housing;
   electrolytic plates being located in said parallel slots;
   means for connecting a plurality of some of said electrolytic plates to said voltage source to create voltage therebetween, other of said electrolytic plates being isolated from said voltage source and interspersed between said electrolytic plates connected to said voltage sources;
   second of said opposing walls of said non-conductive housing being connectable to said first opposing walls to form a sealed container for said reactor;
   seal being located between each of said second opposing walls and said first opposing walls to form said sealed container;
   inlet for receiving said waste effluent and said contaminants into a first end of said reactor;
   outlet for discharging said waste effluent from a second end of said reactor after said waste effluent has circuitously traveled through said reactor over said electrolytic plates;
   number and spacing of said electrolytic plates being connected to said voltage source and said interspersed isolated electrolytic plates being determined by type of said contaminants contained in said waste affluent, said contaminants reacting with said electrolytic plates to change from in solution to in suspension.

25. The reactor for use in removing said contaminants from said waste effluent as recited in claim 24 wherein every other of said slots are connect from opposing ends, lengths of said slots allowing space between opposing ends of each of said electrolytic plates and said non-conductive housing to provide for said circuitous flow.

26. A clarifier for use in removing contaminants from waste affluent, said clarifier comprising:
   containment vessel;
   inlet for receiving said waste affluent and said contaminants into a receiving weir of said containment vessel;
   sloped inlet of said containment vessel in fluid connection with said receiving weir;
   sloped outlet of said containment vessel in fluid connection with an outlet weir, said sloped inlet and said sloped outlet generally forming a V shape;
   clarifier plates of varying depths being suspended from opposing substantially vertical side walls of said containment vessel, said opposing substantially vertical side walls connecting with said sloped inlet and said sloped outlet to form said containment vessel, said clarifier plates terminating just above either said sloped inlet or said sloped outlet;
   passages through said clarifier plates just below the surface of said waste effluent in said containment vessel; and
   an outlet connected to said outlet weir for removing said waste effluent from said containment vessel after treatment, said contaminants precipitating out and settling to a bottom of said containment vessel.

27. The clarifier for use in removing said contaminants from said waste effluent as recited in claim 26 wherein said containment vessel has a valve for extracting said contaminants from said bottom of said containment vessel.

28. The clarifier for use in removing said contaminants from said waste effluent as recited in claim 27 wherein said valve means is a sliding valve that may vary point of said extraction from said containment vessel.

29. The clarifier for use in removing said contaminants from said waste effluent as recited in claim 26 wherein said receiving weir includes baffle for collecting bubbles therein and separating said bubbles from said waste effluent.

30. The clarifier for use in removing said contaminants from said waste effluent as recited in claim 26 wherein said passages are slots just below said surface of said waste effluent, said slots having variable flanges to create a desired turbulence as said waste effluent flows therethrough.

* * * * *